United States Patent
Fletcher et al.

(10) Patent No.: US 7,421,526 B2
(45) Date of Patent: Sep. 2, 2008

(54) RECONFIGURABLE VIRTUAL BACKPLANE ARCHITECTURE

(75) Inventors: Mitchell S. Fletcher, Glendale, AZ (US); Randall H. Black, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 11/211,850

(22) Filed: Aug. 24, 2005

(65) Prior Publication Data

US 2007/0239912 A1    Oct. 11, 2007

(51) Int. Cl.
*G06F 13/00* (2006.01)
(52) U.S. Cl. .................. 710/104; 370/257; 379/156
(58) Field of Classification Search ............. 370/386, 370/388, 395.1, 412, 270, 257; 710/6, 104; 701/3, 14; 700/1; 709/203, 223; 711/118, 711/170; 712/226; 715/772; 361/736; 455/75.1, 455/575.7; 713/1, 322; 714/4; 379/156
See application file for complete search history.

(56) References Cited

U.S. PATENT DOCUMENTS

| | | | | |
|---|---|---|---|---|
| 4,656,624 A | * | 4/1987 | Collins et al. ............... | 370/270 |
| 4,799,159 A | * | 1/1989 | Davidson et al. ............ | 701/14 |
| 5,544,329 A | * | 8/1996 | Engel et al. .................. | 710/6 |
| 5,778,203 A | | 7/1998 | Birkedahl et al. | |
| 5,980,078 A | * | 11/1999 | Krivoshein et al. ......... | 700/1 |
| 6,320,750 B2 | * | 11/2001 | Shaler et al. ................ | 361/736 |
| 6,515,683 B1 | * | 2/2003 | Wright ....................... | 715/772 |
| 6,724,757 B1 | * | 4/2004 | Zadikian et al. ............ | 370/388 |
| 6,865,644 B2 | * | 3/2005 | Husted et al. ............... | 711/118 |
| 6,973,479 B2 | * | 12/2005 | Brady et al. ................. | 709/203 |
| 7,002,961 B1 | * | 2/2006 | Lane et al. .................. | 370/395.1 |
| 7,010,715 B2 | * | 3/2006 | Barbas et al. ................ | 714/4 |
| 7,046,687 B1 | * | 5/2006 | Brown et al. ................ | 370/412 |
| 7,130,724 B2 | * | 10/2006 | Petersen et al. ............. | 701/3 |
| 7,146,480 B2 | * | 12/2006 | Schlansker et al. ......... | 711/170 |
| 2003/0177344 A1 | * | 9/2003 | Harvey ........................ | 713/1 |
| 2003/0235190 A1 | * | 12/2003 | Josyula et al. .............. | 370/386 |
| 2004/0166905 A1 | * | 8/2004 | Cherniski et al. .......... | 455/575.1 |
| 2005/0108376 A1 | * | 5/2005 | Deval et al. ................. | 709/223 |
| 2005/0119764 A1 | * | 6/2005 | Martin et al. ................ | 700/1 |
| 2006/0020774 A1 | * | 1/2006 | Ramos et al. ............... | 712/226 |
| 2006/0234787 A1 | * | 10/2006 | Lee et al. .................... | 455/575.7 |
| 2007/0043964 A1 | * | 2/2007 | Lim et al. .................... | 713/322 |

* cited by examiner

*Primary Examiner*—Christopher E. Lee
(74) *Attorney, Agent, or Firm*—Ingrassia, Fisher & Lorenz, P.C.

(57) ABSTRACT

A communication network comprises a communication bus and at least two line cards. Each of the line cards are coupled to the communication bus The line cards comprise a processor and a configuration memory coupled to the processor. The communication occurring on the communication bus is predetermined, but can be reconfigured during real time operation by events or by the addition or subtraction of line cards. The configuration memory comprising an array of configuration tables, each configuration table storing a listing of processes to run and data to be transmitted or received by the process. A current configuration table is selected from the array of configuration tables upon the occurrence of a predefined event.

20 Claims, 6 Drawing Sheets

RECONFIGURABLE VIRTUAL BACKPLANE ARCHITECTURE

TECHNICAL FIELD OF THE INVENTION

This invention relates to the field of computer platform control systems used for example in avionics, habitat, and robotic systems and more specifically to a reconfigurable virtual backplane architecture.

BACKGROUND OF THE INVENTION

Aircraft and space vehicle control systems are responsible for controlling various systems in an aircraft, such as "fly by wire" guidance and navigation systems, aircraft lighting systems, aircraft environmental control systems, aircraft flight control systems, and aircraft flight management systems. Over time, different types of vehicle control systems have been proposed to provide control functionality while minimizing size, weight, and cost.

One type of this class of control system is a federated system, which provides a dedicated box, typically referred to as a line replaceable unit (LRU), for each control function. For example, in a federated system, a separate LRU is provided for the autopilot system, the navigational system, and the like. Drawbacks to federated systems include excessive weight, large size, and high cost.

To overcome some of these drawbacks, integrated LRU systems that combine several systems into a single LRU have been used. By consolidating several systems into a single LRU, savings in size, weight and cost can be achieved. However, when several systems are integrated into a single LRU, failure of a single system requires the replacement of the entire LRU.

A more recent approach is the integrated modular avionic (IMA) control system. In an IMA system, cabinets containing one or more circuit cards replace the LRUs. A single circuit card or collection of circuit cards contains the electronics necessary to provide a function such as navigation or flight control. If a failure occurs, individual circuit cards are replaceable. In this approach, because of the integration at the cabinet level, it is difficult to create a system that implements functions using multiple cabinets.

To overcome some of these drawbacks, yet another approach utilizing a virtual backplane has been suggested. In a virtual backplane system, the actual location of an element that provides some function is unimportant since data needed by each element is placed on to a common communication bus at a regular predetermined rate. Previously, at the cabinet level, all elements could share data since they were all coupled to the same backplane. However, data exchange between cabinets was limited to typically some element needing to request data in order to receive the data. In the virtual backplane system, each of the elements in each of the cabinets sends and receives information according to a predetermined sequence stored in memory. In this way, an element may be located in any cabinet and behave as if interacting elements were in the same cabinet.

The most recent approach to the virtual backplane system utilizes a fixed schedule of activity on the bus. In this case, the activity that occurs on the backplane is pre-determined prior to system use and does not change during the operation of the computer platform system. The drawback of this system approach is that a single circuit card or collection of circuit cards or a new function within existing cards cannot be added to the architecture while the system is in operation.

SUMMARY OF THE INVENTION

In one embodiment, a communication network comprises a communication bus and at least two line cards. Each of the line cards are coupled to the communication bus. The line cards comprise a processor and a configuration memory coupled to the processor. The configuration memory comprises an array of configuration tables, each configuration table storing a listing of processes to run and data to be transmitted or received by the process. A current configuration table is selected from the array of configuration tables upon the occurrence of a predefined event.

In another embodiment, a line card for use in a modular unit comprises a processor and a configuration memory coupled to the processor. The configuration memory comprising a plurality of configuration data comprising a plurality of configuration tables and a toggle memory relating the occurrence of a predefined event to one of the configuration tables.

A method for operating the virtual backplane in which a line card in a modular unit in a computer network comprises a first step of detecting a predefined event at a process element of the line card. Next, a configuration table to use based on the predefined event and a toggle memory is determined. The data is sent and received from a network bus based on the configuration table.

BRIEF DESCRIPTION OF THE DRAWINGS

The present invention will hereinafter be described in conjunction with the following drawing figures, wherein like numerals denote like elements, and.

DETAILED DESCRIPTIONS OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention discussed herein is an architectural implementation of a Reconfigurable Virtual Backplane. In this architecture, an event can occur such as, but not limited to, new modules or functions being added to the system that alters in real time the function of the system and therefore the activity occurring on the Virtual Backplane. There are many embodiments conceived for the implementation of this patent and the embodiments described herein are not intended to limit the patent to only these embodiments.

Figure 1:
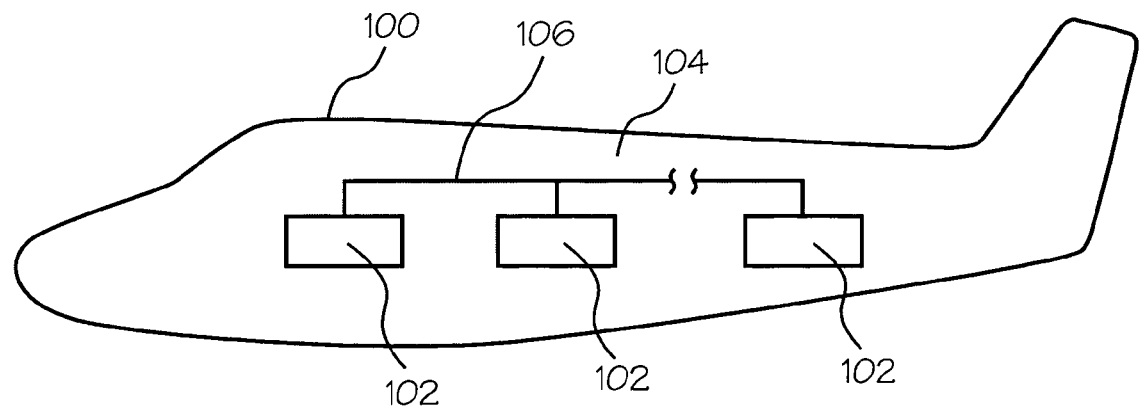
FIG. 1 illustrates a vehicle, habitat, robot, or like system requiring control having multiple modular units coupled by a backplane in accordance with the teachings of the present invention.

FIG. 1 illustrates an exemplary embodiment of the present invention used in an aircraft 100, however this same embodiment could be used in a habitat, robot, or like integrated control system. The aircraft 100 includes a computer network 104 comprising Modular Units (MU) 102 connected by a system bus 106. The MU 102 can support various processing and input/output tasks. For example, at least part of the MU 102 can be used to provide a collision avoidance system for the aircraft. The system bus 106, in one exemplary embodiment of the present invention, allows different MUs 102 to communicate with each other. The communication occurring on system bus 106 is predetermined, but can be reconfigured during real time operation by events within MU 102 or by the addition or subtraction of any MU 102. System bus 106 can be a wired or wireless connection. Wired connections can include both electrical busses and non-electrical busses that support the transfer of data, such as wire lines, optical fibers, and the like. Additionally, system bus, while shown in FIG. 1 as a single bus, can include multiple redundant buses.

In one embodiment of the present invention, system bus 106 behaves as a reconfigurable virtual backplane connecting the individual MUs 102. In this exemplary embodiment, the MUs 102 can communicate with each other as if they were a single MU 102. Therefore, instead of one MU 102 sending a request for data over the system bus 106 to a specific MU 102, data is placed on the system bus 106 and retrieved from the system bus 106 in a predetermined, deterministic manner, using, in one exemplary embodiment, configuration tables. In addition, the tasks performed by the MUs 102 can also be reconfigured dynamically during real time operation based on the occurrence of an event, as will be discussed in detail below.

Figure 2:
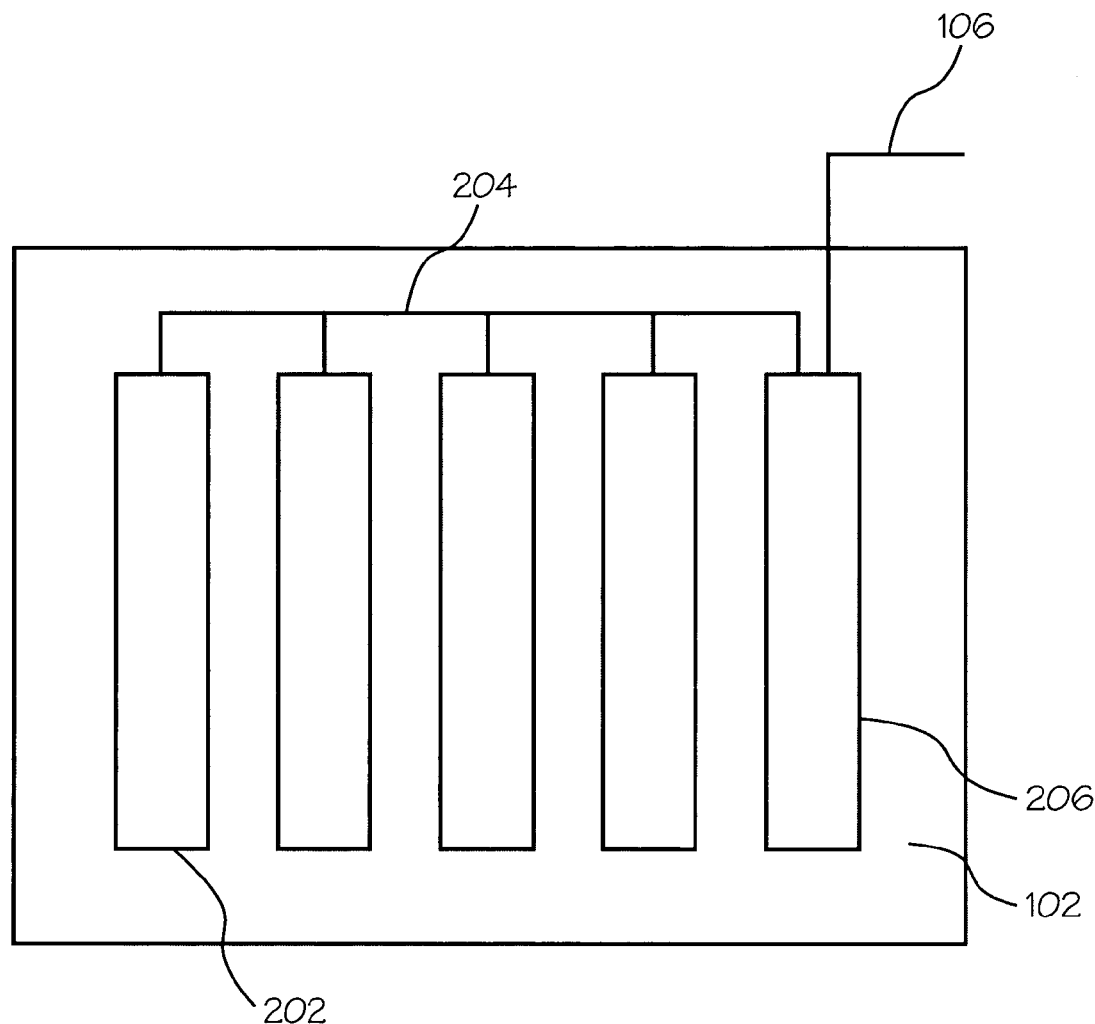
FIG. 2 illustrates an exemplary embodiment of a modular unit in accordance with the teachings of the present invention.

FIG. 2 is a block diagram of an exemplary embodiment of the MUs 102. MU 102 includes one or more line cards 202 coupled by an internal backplane 204. A Network Interface Card (NIC) 206 is also coupled to the internal backplane 204 and the system bus 106.

Line cards 202, in one exemplary embodiment, provides processing and I/O functions. Typical line cards 202 can be loaded with software to perform certain tasks. For example, in an avionics embodiment, the line cards 202 can be programmed to perform collision or terrain avoidance functions.

The internal backplane bus 204 provides a common communication connection between each line card 202 and the NIC 206 in the MU 102. Typically, line card 202 connects to the internal backplane bus 204 by physical insertion of the line card 202 in to a slot (not shown) of the internal backplane bus 204. Alternatively, different ways of connecting the line cards to backplane bus can be used, including wired or wireless connections.

The NIC 206 communicates with the reconfigurable virtual backplane system bus 106 by placing data on the system bus 106 and retrieving data from the system bus 106. As discussed previously, the NIC 206 also receives data from and sends data to line cards 202. In one exemplary embodiment, NIC 206 sends and receives data from the data bus 106 at a predetermined schedule as described in below.

Figure 3:
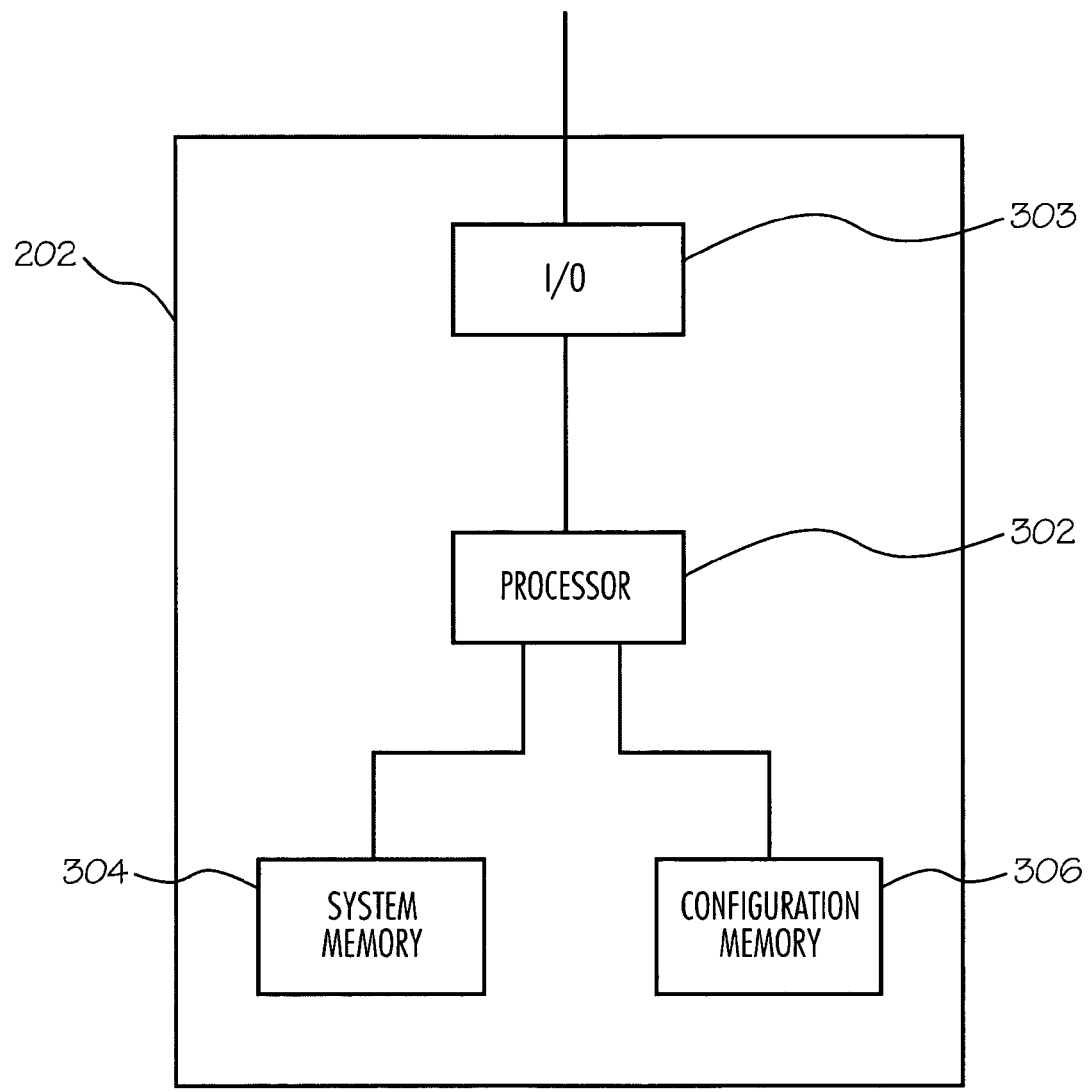
FIG. 3 illustrates an exemplary embodiment of a line card in accordance with the teachings of the present invention.

FIG. 3 is an exemplary block diagram of a line card 202. Line card 202, in one exemplary embodiment, comprises a processor 302 coupled to a system memory 304, a configuration memory 306 and optionally an input/output interface 303. As discussed previously, the line cards 202 can execute programs to provide different functionalities.

Processor 302, in one exemplary embodiment, executes software assigned to run on the line card 202. Although processor 302 is illustrated in FIG. 3 as a single processor, processor 302 can be deployed in any needed redundant configuration such as, but not limited to, lock step or triple modular redundant processing.

I/O interface 303 provides an input/output interface to the backplane 202. Processor 302 is operable to indicate what data the I/O interface 303 should place on the backplane 204, when to place the data on to the backplane 204, and the rate to place the data on the backplane 204. In addition, the processor 302 is operable to instruct the I/O interface 303 when to retrieve data from the backplane 204 and what data to retrieve.

System memory 304 stores data and program files that are executed using processor 302. System memory 304 is preferably a readable/writable memory that can be updated when needed. In one embodiment of the present invention, multiple applications can be stored in system memory 304. The applications selected to be executed can be selected based on the occurrence of an event, as will be discussed in detail below.

Figure 4:
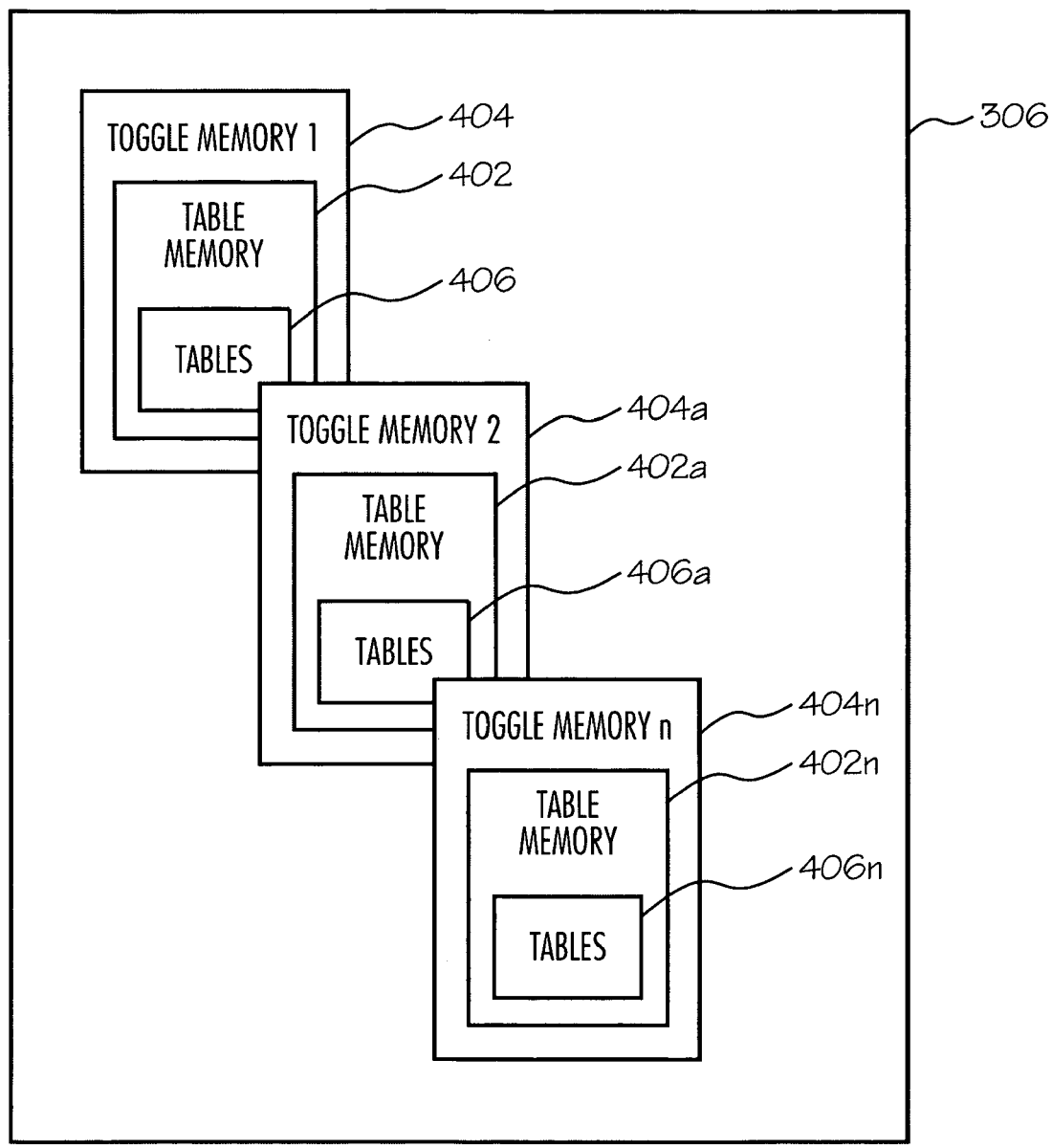
FIG. 4 is a block diagram of a configuration memory in accordance with the teachings of the present invention.

Configuration memory 306, in one exemplary embodiment, comprises a configuration table memory 402, as illustrated in FIG. 4. Configuration table memory 402 comprises a plurality of configuration tables 406. The configuration tables, in one embodiment, contain information as to what programs and sequence of events that should be executed by the processor and what data is to be presented to and from the virtual backplane system. In addition, the configuration tables 406 can contain information as to what data needs to be placed or retrieved from the backplane 204, when to place or retrieve the data and the rate that the data is to be placed or retrieved. The applications running on the processor 302 use the configuration tables 406 to determine the data retrieval and placement information.

In addition to including configuration tables 406 in the table memory 402, configuration memory 306 can be comprised of a multiplicity of toggle memory 404. Toggle memory 404 associates each of the tables 406 with the occurrence of specific events. For example, a given line card 202 may be associated with one task until a certain amount of time has passed. When the time elapses or a predetermined event occurs, toggle memory 404 can be used to determine a new configuration table 406 to use. The new configuration table could then change what the processor 302 was doing, such as by starting a new application and changing the information flow on the virtual backplane. The new configuration table can also change the data retrieved from and sent to the backplane 204. In this exemplary embodiment, the use of configuration tables 406 allows data to be provided or sent in a predetermined, deterministic manner. The ability to change configuration tables 406 based on the occurrence of an event produce a configurable line card.

In one exemplary embodiment of the present invention, an event that can cause a change of the configuration tables can include a change in the number of operating line cards. The change in the number of operating line cards can include the failure or loss of a line card. If a line card 202 malfunctions, a new configuration table 406 can be used that instructs another line card 202 to take over for the failed line card. Additionally, the change in the number of line cards can include the addition of a line card to the MU 102. The addition of a line card can result in a new configuration table that has the new line card takeover some process functions from other line cards 202 A change in the number of operating line cards includes the situation where there is the same number of failed line cards as there are new line cards.

In another exemplary embodiment of the present invention, an event that can cause a change of the configuration tables can include a change in software functionality. A change in software functionality can include the loss of software functionality or the addition of software functionality.

In one exemplary embodiment of the present invention, additional configuration tables can be provided as needed.

For example, if an event occurs that does not have a configuration table, an appropriate configuration table can be generated. In one exemplary embodiment, the configuration table 406 can be generated by the network 101. In an alternate embodiment, the configuration table 406 can be generated by a third party and provided to the network 104. For example, if the network 104 is deployed in a spacecraft, ground control could provide new configuration tables 406.

Figure 5:
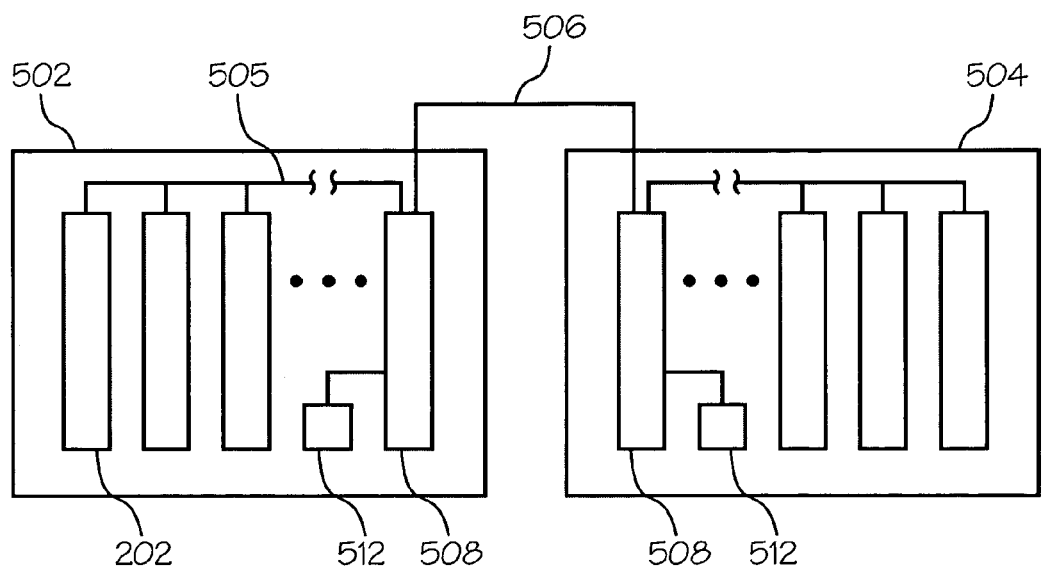
FIG. 5 illustrates the connection of multiple modular units in accordance with the teachings of the present invention.

In the exemplary embodiment shown in FIG. 2-4, the reconfigurable, virtual backplane couples line cards 202 within a MU 102. In another exemplary embodiment, multiple MUs 102 can be connected by a virtual back plane connection. As seen in FIG. 5, a first MU 502 and a second MU 504 are connected by a common system bus 506, which can act as a configurable, virtual backplane bus. This system need not be limited to a first and second MU, but could be comprised of a multiplicity of MUs.

In the exemplary embodiment illustrated in FIG. 5, each of the MUs 502, 504, comprise one or more line cards 202 coupled by an internal backplane 505. The MUs 502 and 504 also comprise a bridge connector 508 coupled to the internal backplane 505.

The bridge connectors 508 serve as a network interface card, connecting the MUs 502, 504 to a system bus 506. The bridge connectors 508, in one exemplary embodiment, include a bridge configuration memory 512 that includes table memory comprising a plurality of configuration tables within a toggle memory. As discussed previously, each of the multiple configuration tables provide the applications running on the bridge connector with information regarding what data to place on or receive from the common system bus 506, when to place or receive the data, and at what rate the data is placed or received.

In one exemplary embodiment, the line cards 202 include a configuration memory as illustrated in FIG. 3. In this embodiment, the internal backplane 505 and the system bus acts as configurable, virtual backplanes. In this manner, an occurrence of some event could change the way any of the line cards 202 and the bridge connectors 508 operates.

In another exemplary embodiment, line cards 202 are non-proprietary, commercially available line cards and the internal backplane 505 serves to couple the line cards in a conventional fashion. For example, the internal backplane 505 can be a PCI bus. In this exemplary embodiment, the bridge connectors 508 allow the MUs 502, 504 to be connected using a reconfigurable virtual backplane. In this embodiment line cards and MUs can be purchased from any of a number of vendors while the MUs are coupled using a reconfigurable, virtual backplane.

Figure 6:
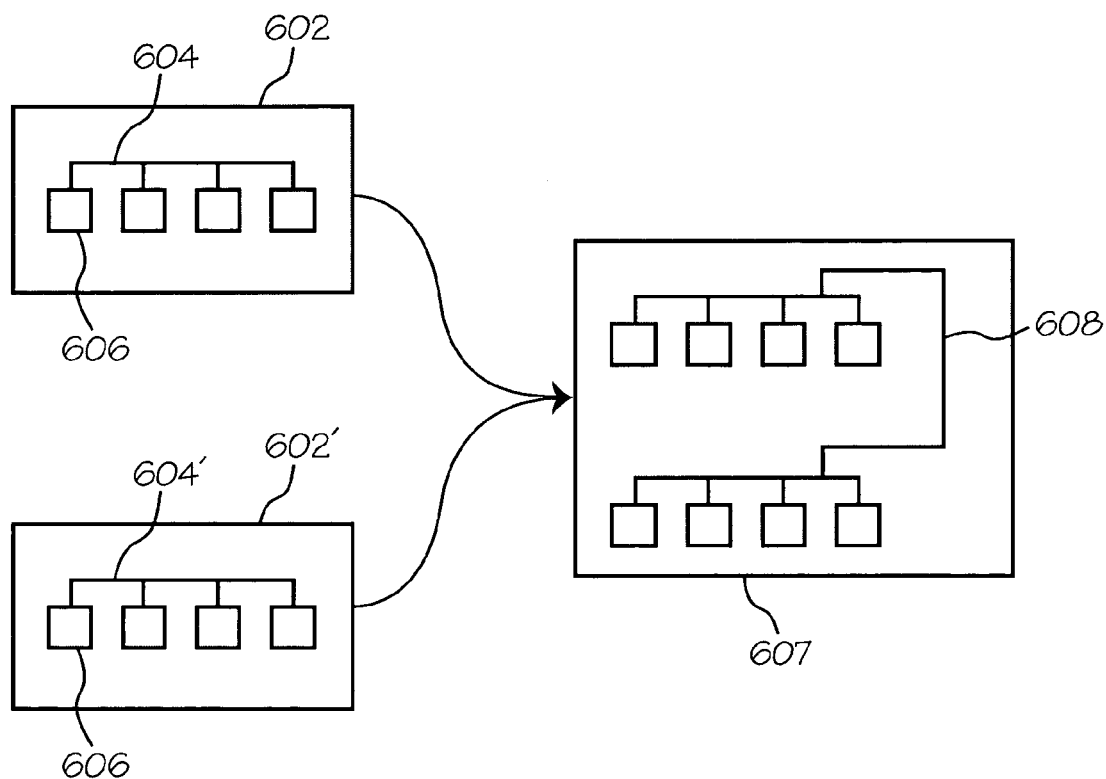
FIG. 6 illustrates the combination of two systems combining to one system having a virtual backplane in accordance with the teachings of the present invention.

The exemplary embodiments discussed previously have dealt with either a reconfigurable virtual back plane coupling individual line cards in a MU or MUs coupled by a virtual backplane (whether or not the line cards within the MUs are coupled by a virtual backplane). Another exemplary embodiment of the present invention is illustrated in FIG. 6, which shows two different systems, a first system 602 and a second system 602'. Each system can be part of different networks and each system includes one or more MUs 606 and 606' coupled by a virtual backplane 604 and 604'.

The systems 602 and 602', when separated, can each perform different functions. For example, the first system 602 can be a space vehicle that at launch includes the crew, while the second system 602' can be a lunar landing vehicle that is launched separate from the first space vehicle. At some point the space vehicle and the lunar landing vehicle will dock, which will allow the crew access to the lunar landing vehicle. When the first system 602 and the second system 602' connect to form a third system 607, the virtual backplanes 604 and 604' are combined to form a combined virtual backplane 608. In one embodiment, the virtual backplanes 604 and 604' are physically coupled upon the docking of first and second systems 602 and 602'. Alternatively, the virtual backplanes 604 and 604' can be coupled by a wireless link that does not require exact physical coupling of the backplanes 604 and 604'.

The connection of the two systems 602 and 602' is an occurrence that can trigger a reconfiguration of one or more systems on the first and second system 602 and 602'. For example, the connection of the first and second system 602 and 602' can trigger changes to current configurations, such as activating the air conditioning and other systems in the lunar module, while altering the flight computer of the first system 602 to compensate for the additional mass of the combined systems. While FIG. 6 illustrates the connection of systems, the disconnection of systems that originally stored a virtual backplane can also initiate configuration changes according to a toggle memory and associated configuration memories.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. A communication network comprising:
   a communication bus;
   at least two line cards, each line card coupled to the communication bus, and each line card comprising:
   a processor, and
   a configuration memory coupled to the processor, the configuration memory comprising an array of configuration tables, each configuration table storing a listing of processes to run and data to be transmitted or received by the process; and wherein a current configuration table is selected from the array of configuration tables upon an occurrence of a predefined event.

2. The network of claim 1 wherein the predefined event is the passage of an amount of time.

3. The network of claim 1 wherein the predefined event is a change in the number of operating line cards.

4. The network of claim 1 wherein the predefined event is a change in software function.

5. The network of claim 1 wherein at least one of the line cards is a bridge controller in a modular unit, and wherein the line cards in the modular unit are non-proprietary line cards in communication with the bridge controller.

6. The network of claim 1 wherein additional tables can be added to the array of tables, each of the additional tables associated with a new predefined event.

7. The network of claim 1 wherein each line card further comprises a toggle memory for storing the predefined events and related configuration tables.

8. The network of claim 1 wherein the communication bus may be, at least partially, a wireless communication bus.

9. The network of claim 1, wherein at least one of the line cards are in a first network having a reconfigurable, virtual backplane and at least one of the line cards are in a second network having a reconfigurable, virtual backplane, the first network and second network combinable to form a third network having a reconfigurable, virtual backplane.

10. A method for operating a line card in a modular unit in a computer network comprising:
   detecting a predefined event at a processor of the line card;
   determining a configuration table to use based on the predefined event and a toggle memory; and
   sending and receiving data from a network bus based on the configuration table.

11. The method of claim 10 wherein the step of detecting a predefine event further comprises detecting a passage of a predetermined amount of time.

12. The method of claim 10 wherein the step of detecting a predefine event further comprises detecting a change in the number of operating line cards.

13. The method of claim 10 wherein the step of detecting a predefine event further comprises a change in software function.

14. The method of claim 10 wherein the step of sending and receiving data from a network bus further comprises sending and receiving data from a network bus that is internal to one modular unit.

15. The method of claim 10 wherein the step of sending and receiving data from a network bus further comprises sending and receiving data from a network bus that connects at least two modular unit.

16. A line card for use in a modular unit comprising:
   a processor; and
   a configuration memory coupled to the processor, the configuration memory comprising a plurality of configuration tables, each of the configuration tables comprising a plurality of configuration data; and
   a toggle memory relating an occurrence of a predefined event to one of the configuration tables.

17. The line card of claim 16 wherein additional configuration tables can be added to the configuration memory.

18. The line card of claim 16 further comprising an input/output interface coupling the line card to a bus.

19. The line card of claim 18 wherein the bus is a bus internal to the modular unit.

20. The line card of claim 18 wherein the bus is bus connection the modular unit to another modular unit.

* * * * *